United States Patent
Brownell et al.

(10) Patent No.: US 9,891,136 B2
(45) Date of Patent: Feb. 13, 2018

(54) METHODS TO DETERMINE A BEARING SETTING

(71) Applicant: Deere & Company, Moline, IL (US)

(72) Inventors: Douglas K. Brownell, Independence, KS (US); Stacy K. Worley, Coffeyville, KS (US); Kyle K. McKinzie, Altamont, KS (US); Robert L. Wood, Jr., Independence, KS (US)

(73) Assignee: DEERE & COMPANY, Moline, IL (US)

( * ) Notice: Subject to any disclaimer, the term of this patent is extended or adjusted under 35 U.S.C. 154(b) by 176 days.

(21) Appl. No.: 14/871,819

(22) Filed: Sep. 30, 2015

(65) Prior Publication Data
US 2017/0089806 A1   Mar. 30, 2017

(51) Int. Cl.
G01M 13/04 (2006.01)
F16C 43/04 (2006.01)
F16C 35/06 (2006.01)
F16C 19/36 (2006.01)
F16C 25/06 (2006.01)
F16C 19/54 (2006.01)

(52) U.S. Cl.
CPC ......... G01M 13/045 (2013.01); F16C 19/364 (2013.01); F16C 19/546 (2013.01); F16C 25/06 (2013.01); F16C 35/06 (2013.01); F16C 43/04 (2013.01); F16C 2233/00 (2013.01)

(58) Field of Classification Search
CPC ............ F16C 2229/00; F16C 2233/00; Y10T 29/49696; Y10T 29/497; G01M 13/04; G01M 13/045
See application file for complete search history.

(56) References Cited

U.S. PATENT DOCUMENTS

| | | | |
|---|---|---|---|
| 3,581,362 A | * | 6/1971 | Turner .................. B21K 25/00 29/441.1 |
| 4,203,319 A | | 5/1980 | Lechler |
| 4,511,837 A | | 4/1985 | Vermeiren et al. |
| 5,306,088 A | * | 4/1994 | Zoerner .................. F16C 33/06 356/43 |

(Continued)

FOREIGN PATENT DOCUMENTS

DE   102013201324   7/2014

OTHER PUBLICATIONS

DE102016218393.1 Search Report from the German Intellectual Property Office dated Jun. 30, 2017 (11 pages, which includes a Statement of Relevance).

Primary Examiner — Jason L Vaughan
(74) Attorney, Agent, or Firm — Michael Best & Friedrich LLP

(57) ABSTRACT

A method for determining a bearing setting of a bearing in a shaft assembly, in which the shaft assembly includes a housing and a shaft rotatable with respect to the housing, with the bearing including a first bearing part coupled to the shaft and a second bearing part coupled to the housing, includes positioning a first portion of a measuring device in direct or indirect contact with the housing and a second portion of the measuring device in direct or indirect contact with the shaft. The method also includes measuring with the measuring device a parameter indicative of an amount of contact between the first bearing part and the second bearing part.

13 Claims, 4 Drawing Sheets

(56) References Cited

U.S. PATENT DOCUMENTS

| | | | | |
|---|---|---|---|---|
| 5,341,569 | A | * | 8/1994 | Takamizawa ........... F16C 19/08 |
| | | | | 29/898 |
| 5,488,871 | A | | 2/1996 | Harbottle et al. |
| 5,602,437 | A | | 2/1997 | Shahamat et al. |
| 5,685,068 | A | * | 11/1997 | Bankestrom ............ F16C 25/06 |
| | | | | 29/407.08 |
| 5,971,619 | A | * | 10/1999 | Bourgeois-Jacquet  F16C 19/166 |
| | | | | 384/448 |
| 6,003,229 | A | * | 12/1999 | Beduhn ................ B23P 19/066 |
| | | | | 29/407.02 |
| 6,202,306 | B1 | * | 3/2001 | Miyazaki ................ F16C 19/08 |
| | | | | 29/898.062 |
| 6,286,374 | B1 | | 9/2001 | Kudo et al. |
| 6,446,339 | B2 | * | 9/2002 | Takamizawa ........... F16C 19/08 |
| | | | | 29/446 |
| 6,556,026 | B2 | | 4/2003 | Ogimoto et al. |
| 7,251,892 | B2 | * | 8/2007 | Strait ................... F16C 19/548 |
| | | | | 29/407.01 |
| 7,503,216 | B2 | * | 3/2009 | Yamada ................. F16C 19/52 |
| | | | | 73/593 |
| 7,617,610 | B2 | * | 11/2009 | Song ...................... G01B 5/146 |
| | | | | 29/898.09 |
| 8,342,039 | B2 | * | 1/2013 | Wickens ................ F16C 25/06 |
| | | | | 73/862.55 |
| 2010/0299926 | A1 | * | 12/2010 | Stitzinger ............... F16C 19/52 |
| | | | | 29/898.09 |
| 2015/0211572 | A1 | * | 7/2015 | Casazza .................... F03D 7/00 |
| | | | | 290/44 |
| 2015/0247529 | A1 | * | 9/2015 | Klos .................... F16C 19/522 |
| | | | | 374/46 |

\* cited by examiner

US 9,891,136 B2

METHODS TO DETERMINE A BEARING SETTING

BACKGROUND

The present disclosure relates to methods for assembling a shaft including a bearing. In particular, the present disclosure relates to methods for accurately determining the setting of a bearing.

SUMMARY

A method for determining a bearing setting of a bearing in a shaft assembly, in which the shaft assembly includes a housing and a shaft rotatable with respect to the housing, with the bearing including a first bearing part coupled to the shaft and a second bearing part coupled to the housing, includes positioning a first portion of a measuring device in direct or indirect contact with the housing and a second portion of the measuring device in direct or indirect contact with the shaft. The method also includes measuring with the measuring device a parameter indicative of an amount of contact between the first bearing part and the second bearing part.

A method for determining a bearing setting of a bearing in a shaft assembly, in which the shaft assembly includes a housing and a shaft rotatable with respect to the housing, with the bearing including a first bearing part coupled to the shaft and a second bearing part coupled to the housing, includes positioning a first lead of a measuring device in electrical contact with the housing and positioning a second lead of the measuring device in electrical contact with the shaft. The method also includes applying a stimulus with the measuring device. The method further includes measuring with the measuring device an electrical resistance between the first lead and the second lead. The method additionally includes based on the measuring, correlating the electrical resistance with a bearing force between the first bearing part and the second bearing part.

A method of setting a tapered roller bearing includes coupling a first bearing part including a cup to a housing and coupling a second bearing part including a cone to a shaft. The method also includes positioning a first portion of a measuring device in direct or indirect contact with the cup and positioning a second portion of the measuring device in direct or indirect contact with the cone. The method further includes measuring with the measuring device a value for at least one of resistance, capacitance, inductance, or vibration noise between the first portion of the measuring device and the second portion of the measuring device. The method also includes based on the value, adjusting the proximity of the first bearing part to the second bearing part.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

Figure 1:
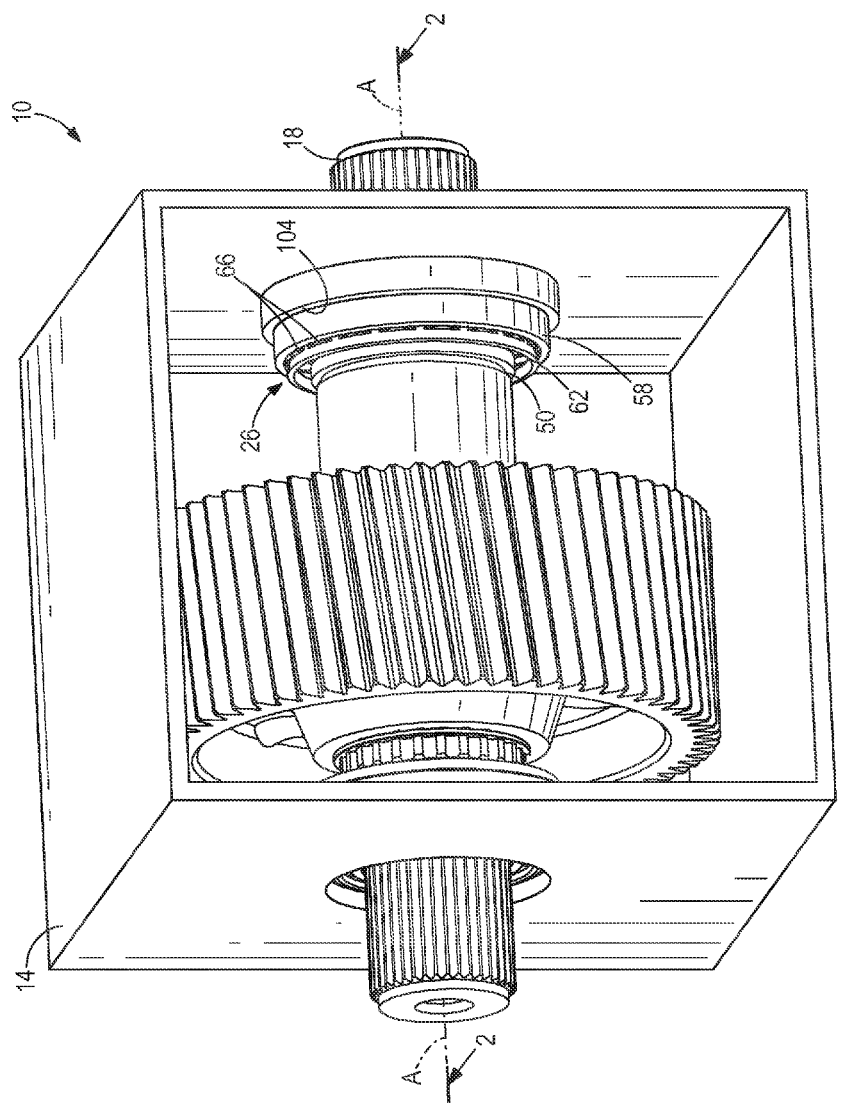
FIG. 1 is a perspective view of a shaft assembly.
Figure 2:
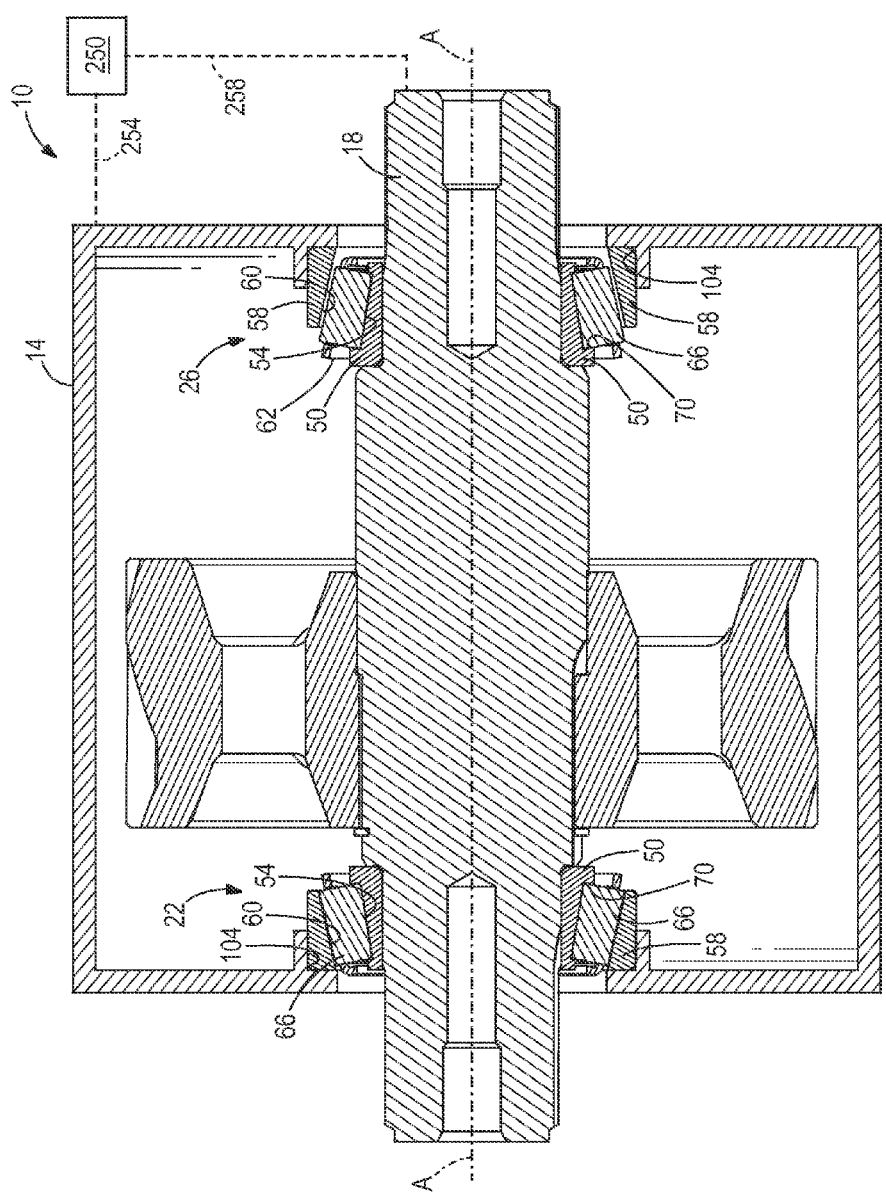
FIG. 2 is a cross-sectional view of the shaft assembly of FIG. 1 along 2-2 and in a first state.

FIGS. 1 and 2 illustrate a shaft assembly 10 according to an embodiment of the disclosure. The shaft assembly 10 includes a housing 14 and a shaft 18 extending through the housing 14. First and second bearings 22, 26 are positioned between the housing 14 and the shaft 18 at opposite sides of the housing 14 such that the shaft 18 is constrained axially relative to the housing 14 and rotatable relative to the housing 14. Both the housing 14 and the shaft 18 are generally constructed from the same or a different suitable metal.

Figure 3:
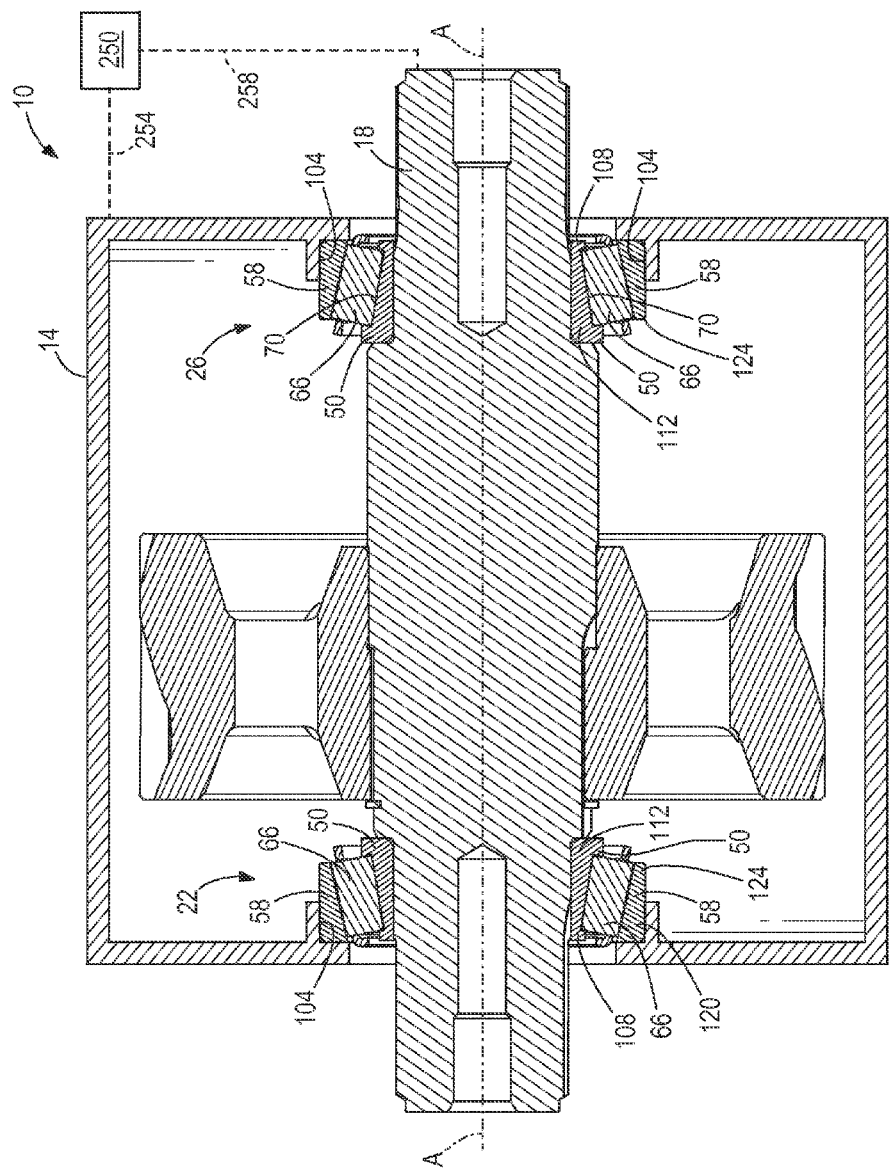
FIG. 3 is a cross-sectional view of the shaft assembly of FIG. 1 along 2-2 in a second state.

With respect to FIGS. 1-3, the first bearing 22 and the second bearing 26 comprise the same components, and therefore like reference numerals are duplicated for like components. In particular, the first and the second bearings 22, 26 each include a first inner race or cone 50 having a tapered outer surface 54 and a second, outer race or cup 58 having a tapered inner surface 60 opposing the outer surface 54. A roller assembly 62 houses a plurality of circumferentially distributed rolling elements 66 (i.e., rollers). The rollers 66 are arranged in a track 70 formed in a respective cone 50 and are positioned radially between the cone 50 and cup 58 of the associated bearing 22, 26. The cone 50 and roller assembly 62 together define a first bearing part while the cup 58 defines a complementary second bearing part.

With particular respect to FIG. 3, the cups 58 are sized and shaped to be received in counterbores 104 of the housing 14. The counterbores 104 function as a stop surface for accurately positioning the cups 58. An inner diameter of each cone 50 is sized and shaped to receive and secure the shaft 18 in a press-fit engagement (i.e., a zero-clearance mating interface), although other suitable manners of mounting the cones 50 upon the shaft 18 are possible. The first bearing part is therefore configured to be received by the second bearing part. Specifically, the cones 50 of each of the first and the second bearings 22, 26 have a smaller outer diameter at a first end 108, which gradually increases towards a second end 112. Likewise, the cups 58 of each of the first and the second bearings 22, 26 have a smaller inner diameter at a first end 120, which gradually decreases towards a second end 124. The cup 50, cone 58, and the roller assembly 62 (including the rollers 66) of each of the first and the second bearings 22, 26 are constructed from a suitable metal, which may be different than that of the housing 14 and the shaft 18.

The shaft assembly 10 may be assembled in several ways known to those skilled in the art. As one example, the shaft assembly 10 is assembled, at least in part, by installing the cups 58 of each of the first and second bearings 22, 26 into the counterbores 104. The cones 50 are secured to the shaft 18, after which the shaft 18 is oriented in the housing 14 such that the cones 50 are positioned in the respective cups 58 with the rollers 66 therebetween. As the cones 50 and the cups 58 are pressed into one another, the rollers 66 come into greater contact with the outer surface 54 of the cones 50 and the inner surface 60 of the cups 58. Once appropriately positioned, the first and second bearings 22, 26 are in endplay (i.e., a first state shown in FIG. 2) and have a relatively loose fit. In other words, less than 100% of the rollers 66 are in contact with the outer and inner surfaces 54, 60, respectively, of the respective cones and cups 50, 58. Often, when the shaft assembly 10 is in endplay, fewer than 50% of the rollers 66 are in contact with both the cone 50 and the cup 58 at the same time. A fastener (not shown) at each end of the shaft 18 is then applied and tightened to set the respective first and the second bearings 22, 26 into preload (i.e., a second state shown in FIG. 3). Additionally or alternatively, the first and the second bearings 22, 26 may be set by shimming or precise machining. When the first and the second bearings 22, 26 are in preload the percentage of rollers 66 contacting the outer and inner surfaces 54, 60, respectively, of the respective cups and cones 58, 50 increases to about 100% (i.e., all or substantially all of the rollers 62 are in contact). Additional or alternative steps necessary to assemble the shaft assembly are well known in the art but not specifically discussed herein.

Tapered roller bearings, as with most types of bearings, need to be installed with a sufficient bearing or compressive force between the cones 50 and cups 58, which tends to keep the bearing parts together. Too great a bearing force, however, can damage the bearings.

Figure 4:
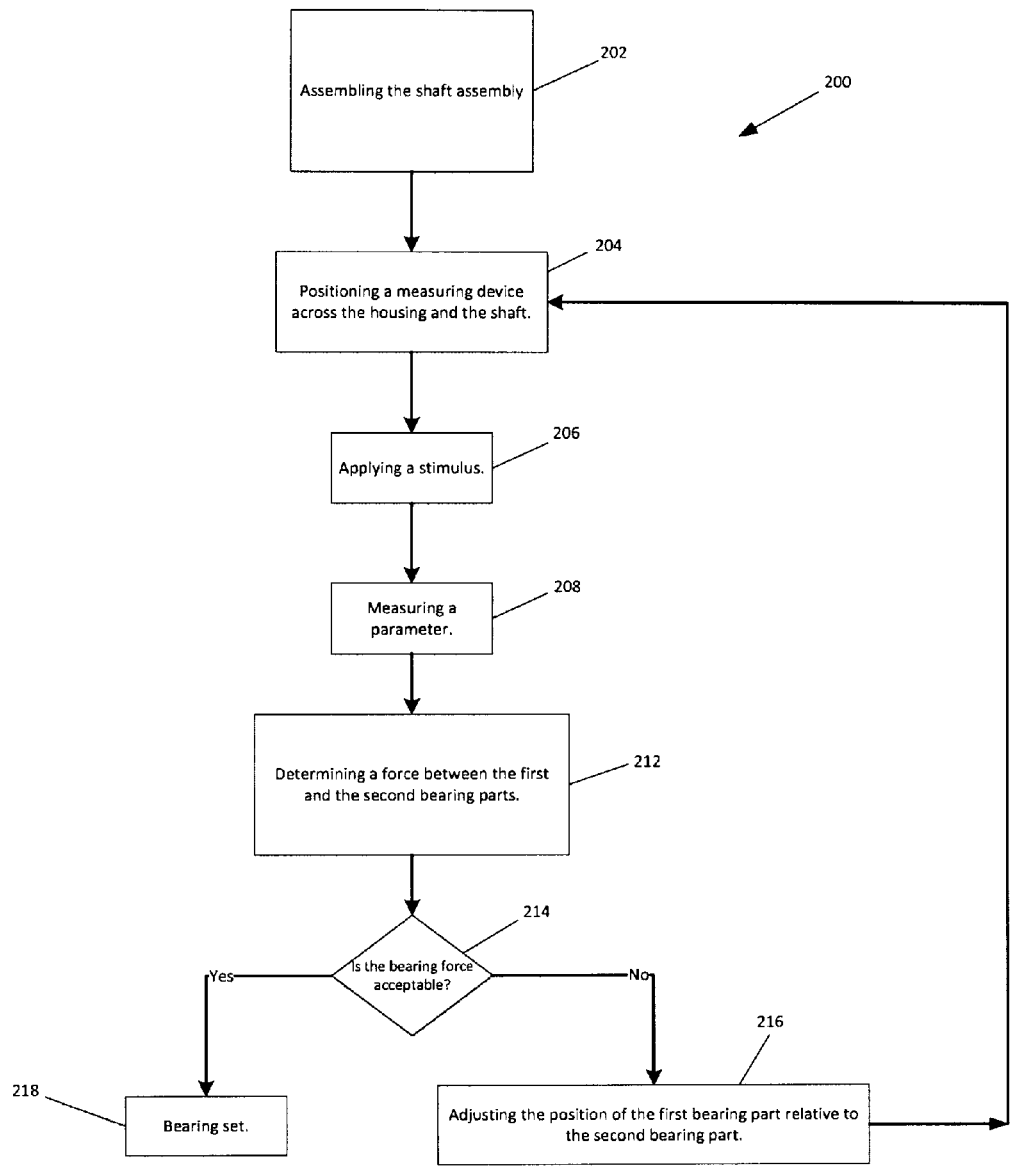
FIG. 4 is flow diagram for determining and adjusting the bearing force of a tapered roller bearing.

FIG. 4 shows a flow chart of an exemplary method 200 for determining a bearing force. Once the shaft assembly 10 is assembled (step 202), the method 200 includes directly or indirectly contacting, or coupling, or positioning a measuring device between or across the housing and the shaft (step 204), applying a stimulus (step 206), and measuring a parameter indicative of an amount of contact between a first bearing part (e.g., the cone 50 and roller assembly 62) and a second bearing part (e.g., the cup 58) (step 208). The method 200 also includes determining a force between the first and the second bearing parts by comparing the measured parameter to a predetermined value for the parameter (step 212).

With reference to FIGS. 2 and 3, measuring the parameter indicative of an amount of contact between the first and the second bearing parts (step 208) can be accomplished with a measuring device or meter 250.

Electrical resistance, capacitance, inductance, thermal gradient, and vibrational noise can be used to determine the degree of contact between two metal parts. As a result, these properties can be used to measure the amount of contact between or across the first and the second bearing parts (e.g., the cone 50, the cup 58, and the roller assembly 62) of the first and the second bearings 22, 26. The meter 250 can be in the form of, for example, an ohmmeter, a LCR meter, a capacitance meter, an add-on capacitance meter, or an accelerometer. Accordingly, as indicated at step 204, the method includes contacting or coupling or positioning the meter 250 between or across the housing 14 and the shaft 18 and measuring one or more of a resistance, a capacitance, an inductance, a thermal gradient or difference, or a vibrational noise between the first and the second bearing parts.

To measure electrical parameters such as resistance, capacitance, and inductance, a first test lead 254 of the meter 250 is positioned in contact with the housing 14 (FIGS. 2 and 3), which is in contact and communication with the second bearing part (e.g., the cup 58). Similarly, a second test lead 258 of the meter 250 is positioned in contact with the shaft 18 (FIGS. 2 and 3), which is in contact and communication with the first bearing part (e.g., the cone 50 and the roller assembly 62). The rollers 66 are positioned between the cone 50 and the cup 58 and, as discussed above, are configured to be in contact and communication with both the cone 50 and the cup 58 via the respective outer and inner surfaces 54, 60. In additional embodiments, the leads 254, 258 could be in contact with or coupled to auxiliary structures (e.g., plates or tabs) that are themselves coupled to the housing 14 and the shaft 18, respectively. In some embodiments, the leads 254, 258 could be in direct contact with the respective cone 50 and cup 58. In general, it may be possible, depending on the specific bearing type and configuration, to connect the leads 254, 258 to any element of the bearing, housing, or shaft on opposite sides of the rollers in order to determine the level of bearing force across those elements.

Further considering step 208, in response to a stimulus, i.e., a direct current (DC) or alternating current (AC) excitation, the meter 250 measures one or more of a resistance, a capacitance, or inductance between housing 14 and the shaft 18 to determine the impedance between the first and the second bearing parts.

In the context of the tapered roller bearings 22, 26, increased bearing force between the outer and inner surface 54, 60 of the cone 50 and the cup 58, respectively, increases contact between the outer surface 54 and the rollers 66 and between the rollers 66 and the inner surface 60. Accordingly, the electrical resistance through these assembled components decreases. Therefore, the first and second bearings 22, 26 have a greater resistance when in endplay than preload. In contrast, as contact through these assembled components increases, the capacitance increases for a given AC excitation stimulus. Therefore, the first and second bearings 22, 26 have a decreased capacitance when in endplay than when in preload.

Further considering step 212, the measured values for one or more of resistance, capacitance, or inductance are used to determine or estimate a force between the first and the second bearing parts (in this context, "determine" can also include exact force calculations as well as estimations and force identification via lookup tables, etc.). In particular, the method further includes comparing or correlating the measured values for one or more of resistance, capacitance, or inductance to a predetermined value, a range of values, or a table of values for the same. In other words, the measured values for resistance, capacitance, and/or inductance can be correlated to the predetermined value, range of values, or table of values to determine or estimate the bearing force.

With continued reference to FIG. 4 and with respect to step 208, the stimulus can be in the form of a vibrational signal. A high frequency vibration-based stimulus will generate vibration-induced "noise" emitted by contact between the first and the second bearing parts. Accordingly, and with respect to step 212, the noise emitted can be measured by the measuring device (e.g., by an accelerometer). As the outer and inner surface 54, 60 of the cone 50 and the cup 58, respectively, increase in contact with the rollers 66, the detected noise value will drop. Therefore, the first and second bearings 22, 26 have a greater vibration noise value when in endplay than in preload.

The stimulus can also be in the form of a thermal signal, i.e., a temperature gradient across the first and the second bearing parts At step 212 the measured values of noise are used to determine or estimate a compressive or bearing force between the first bearing part and the second bearing part. In particular, the method further includes comparing the measured values for vibrational noise to a predetermined value, a range of values, or a table of values to determine or estimate the bearing force of between the first and the second bearings 22, 26.

The method 200 can be further used to adjust the bearing force to a desired value or within a desired range. Accordingly, once the bearing force has been initially determined, the position of the first bearing part can be adjusted relative to the second bearing part based on a difference between the measured parameter and the predetermined value, a range of desired values, or a table of values for the parameter as indicated at step 216. Once the first and the second bearing parts have been adjusted using known techniques the bearing force can be re-determined using steps 208, 210, and 212. This process can continue iteratively until the measured parameter indicates the appropriate bearing force.

The bearing force between the first and the second bearing parts is important to preserve the life of the bearings 22, 26. A bearing force that is too great big or is insufficient may cause the bearings to wear more quickly and/or catastrophically, which is detrimental to the life of the machine in which the shaft assembly is a part. Any of the methods previously described, i.e., measurements involving resistance, capacitance, inductance, or vibration-induced noise can be used alone or in combination to determine the bearing force of tapered roller bearings in a shaft assembly. Additionally or alternatively, the methods described herein can be used to verify a bearing force adjusted by any known method.

The first and second bearings 22, 26 may also have alternative or additional constructions or features other than those illustrated and described herein, and the method may be applicable to, for example, roller bearings, ball bearings, ball thrust bearings, roller thrust bearings, etc., and may be additionally applicable to other components or component assemblies having a complementary relationship. In addition, the method disclosed herein can be applied to any use of any number of bearings mounted between a shaft and another part of a machine or device, including between a shaft and a housing, frame, or any other structure or element. Further, the term "housing" is used broadly to include and encompass all such other structures and elements.

Various features and advantages of the disclosure are set forth in the following claims.

What is claimed is:

1. A method for determining a bearing setting of a bearing in a shaft assembly, the shaft assembly including a housing and a shaft rotatable with respect to the housing, the bearing including a first bearing part coupled to the shaft and a second bearing part coupled to the housing, the method comprising:
    positioning a first portion of a measuring device in direct or indirect contact with the housing and a second portion of the measuring device in direct or indirect contact with the shaft; and
    measuring with the measuring device a parameter indicative of an amount of contact between the first bearing part and the second bearing part,
    wherein measuring a parameter indicative of an amount of contact between the first bearing part and the second bearing part includes measuring a value of one or more of resistance, capacitance, or inductance.

2. The method of claim 1, further comprising applying a stimulus to the shaft assembly, the stimulus being one or more of an AC excitation or a DC excitation.

3. The method of claim 1, further comprising adjusting either or both of the first and second bearing parts based at least in part upon measuring the parameter.

4. The method of claim 1, wherein the bearing is a tapered roller bearing.

5. The method of claim 1, wherein the first bearing part is a cup coupled to the housing and the second bearing part is a cone coupled to the shaft, and wherein positioning a first portion of a measuring device in direct or indirect contact with the housing and a second portion of the measuring device in direct or indirect contact with the shaft includes positioning the first portion of the measuring device in direct or indirect contact with the cup and the second portion of the measuring device in direct or indirect contact with the cone.

6. A method for determining a bearing setting of a bearing in a shaft assembly, the shaft assembly including a housing and a shaft rotatable with respect to the housing, the bearing including a first bearing part coupled to the shaft and a second bearing part coupled to the housing, the method comprising:
    positioning a first lead of a measuring device in electrical contact with the housing;
    positioning a second lead of the measuring device in electrical contact with the shaft;
    applying a stimulus with the measuring device;
    measuring an electrical parameter between the first lead and the second lead with the measuring device; and
    based on the measuring, correlating the electrical parameter with a bearing force between the first bearing part and the second bearing part,
    wherein the electrical parameter includes one of an electrical resistance, capacitance, or inductance.

7. The method of claim 6 wherein positioning a first lead of a measuring device in electrical contact with the housing includes positioning the first lead of the measuring device in electrical contact with the second bearing part, and wherein positioning the second lead of the measuring device in electrical contact with the shaft includes positioning the second lead of the measuring device in electrical contact with the first bearing part.

8. The method of claim 7, wherein the bearing is a tapered roller bearing, the second bearing part being a cup coupled to the housing, and the first bearing part being a cone coupled to the shaft.

9. A method of setting a tapered roller bearing, the method including:
    coupling a first bearing part including a cup to a housing;
    coupling a second bearing part including a cone to a shaft;
    positioning a first portion of a measuring device in direct or indirect contact with the cup;
    positioning a second portion of the measuring device in direct or indirect contact with the cone;
    measuring with the measuring device a value for at least one of resistance, capacitance, or inductance between the first portion of the measuring device and the second portion of the measuring device; and
    based on the value, adjusting the proximity of the first bearing part to the second bearing part.

10. The method of claim 9, wherein measuring a value for at least one of resistance, capacitance, or inductance means measuring a resistance.

11. The method of claim 9, wherein measuring a value for at least one of resistance, capacitance, or inductance means measuring a capacitance.

12. The method of claim 9, wherein measuring a value for at least one of resistance, capacitance, or inductance means measuring an inductance.

13. The method of claim 9, further comprising applying a stimulus with the measuring device, the stimulus being one or more of an AC excitation or a DC excitation.

* * * * *